Figure 1:
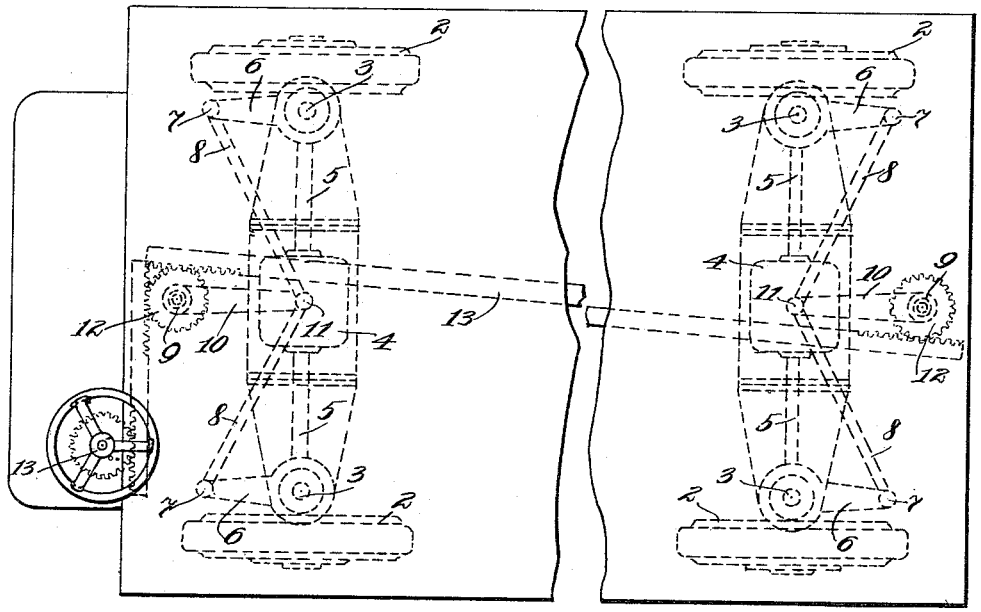

J. McGEORGE.
STEERING MECHANISM FOR VEHICLES.
APPLICATION FILED MAR. 14, 1913. RENEWED MAY 13, 1918.

1,285,289.

Patented Nov. 19, 1918.

3 SHEETS—SHEET 1.

WITNESSES:
R. L. Bruck.
Brennan B. West

INVENTOR.
John McGeorge
By Hull & Smith,
Attys.

UNITED STATES PATENT OFFICE.

JOHN McGEORGE, OF CLEVELAND, OHIO, ASSIGNOR TO THE CLEVELAND ENGINEERING COMPANY, OF CLEVELAND, OHIO, A CORPORATION OF OHIO.

STEERING MECHANISM FOR VEHICLES.

1,285,289.

Specification of Letters Patent.

Patented Nov. 19, 1918.

Application filed March 14, 1913, Serial No. 754,234. Renewed May 13, 1918. Serial No. 234,309.

*To all whom it may concern:*

Be it known that I, JOHN McGEORGE, a citizen of the United States, residing at Cleveland, in the county of Cuyahoga and State of Ohio, have invented a certain new and useful Improvement in Steering Mechanism for Vehicles, of which the following is a full, clear, and exact description, reference being had to the accompanying drawings.

This invention relates to vehicles and particularly to self-propelled vehicles, and has for its special objects the provision of improved mechanism for steering the same. It is a well-known fact that, for the proper steering of any vehicle, the axes of the various wheels must, when extended, always intersect at a single point which point then forms the center about which the entire vehicle turns. In the case of a vehicle having steering wheels only at the forward end in accordance with the usual construction the locus of the point of intersection of the axes of the front wheels must always fall substantially upon the extended axis of the rear wheels, while in a four-wheel steer the locus of the point of intersection of the axes of all the wheels must fall substantially upon the transverse line through the middle of the vehicle. The various steering wheels are generally connected together by means of some system of links, levers, wheels, chains, gears, and the like, whose angles are so chosen as to maintain the wheels in the proper relative position during a considerable angle of turning. There is, however, no system in common use whereby the angles remain even approximately correct through a turning angle of more than about thirty degrees. Certain mechanical expedients involving variable gears and the like have, indeed, been devised whereby the various angles will remain correct up to a much larger angle of deflection, but these devices have been of complicated, expensive, and unreliable nature and sure to work loose and give trouble within a very short time.

Furthermore, up to the present time substantially the whole practical development of the art has been along the type of a vehicle wherein the power is applied to the two rear wheels which are carried upon a rigid axle, and the steering is effected by means of the front wheels which are pivoted to the ends of the fore axle, the forward wheels having no power connection. With this type of vehicle it is not particularly important that the range of possible deflection of the forward wheels is restricted to a relatively narrow angle, owing to the fact that a deflection of 45° is the absolute limiting angle even under theoretically perfect conditions, inasmuch as above this point the forward wheels will inevitably skid or slip instead of running along their courses, and, under ordinary conditions of road surfaces, slipping and skidding will begin to take place considerably in advance of this point. Moreover at these high deflections a very severe strain is thrown upon the carriage and upon the steering wheels and the differential or compensating gear ordinarily employed is not particularly satisfactory in operation when the difference between the rate of rotation of the wheels is so extremely great as in the deflections mentioned. As a result of all these reasons no material investigation or improvement along this line has taken place for a considerable time, since the rear drive vehicle was sufficient for most purposes, and the maximum of 30° deflection for the steering wheels was not only the highest which could successfully be employed with this kind of drive, but gave a sufficiently short turning radius for most practical purposes.

More recently, however, the subject of a wide angle steering linkage has received renewed emphasis by reason of the demand for self-propelled vehicles to be used in crowded and congested places and which can be turned and maneuvered in cramped and narrow quarters, as in docks, railway station platforms, ware-houses, and the holds of ships. This use practically necessitates a vehicle which can be turned within a space not materially greater than its own size, inasmuch as the manner of handling freight has grown up about the use of the ordinary two wheeled stevedore's truck, and a vehicle, to find favor in the eyes of users, must be such as can be adopted without the necessity for any far-reaching re-organization of the present system.

Accordingly the object of this invention is the provision of such a combination of steering and driving mechanism as will permit a vehicle equipped with the same to be maneuvered with greater flexibility than has ever heretofore been possible; the provision of a combined steering and driving mechanism in which the center and radius of turning shall be substantially the same irrespective of the direction of propulsion of the vehicle; the provision of a steering linkage of great simplicity and reliability whereby a deflection of the wheels through an angle as high as 85° is permitted with a minimum of angular error, in combination with a driving mechanism permitting the employment of the full range of steering deflection; while other objects and advantages of the invention will become apparent as the description proceeds.

Figure 2:
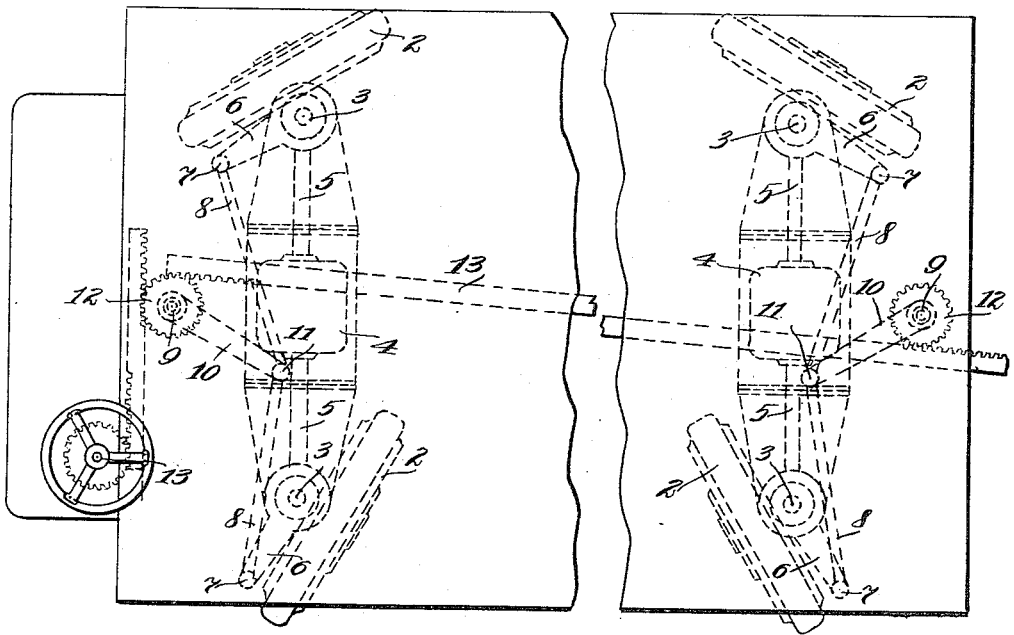
Figure 3:
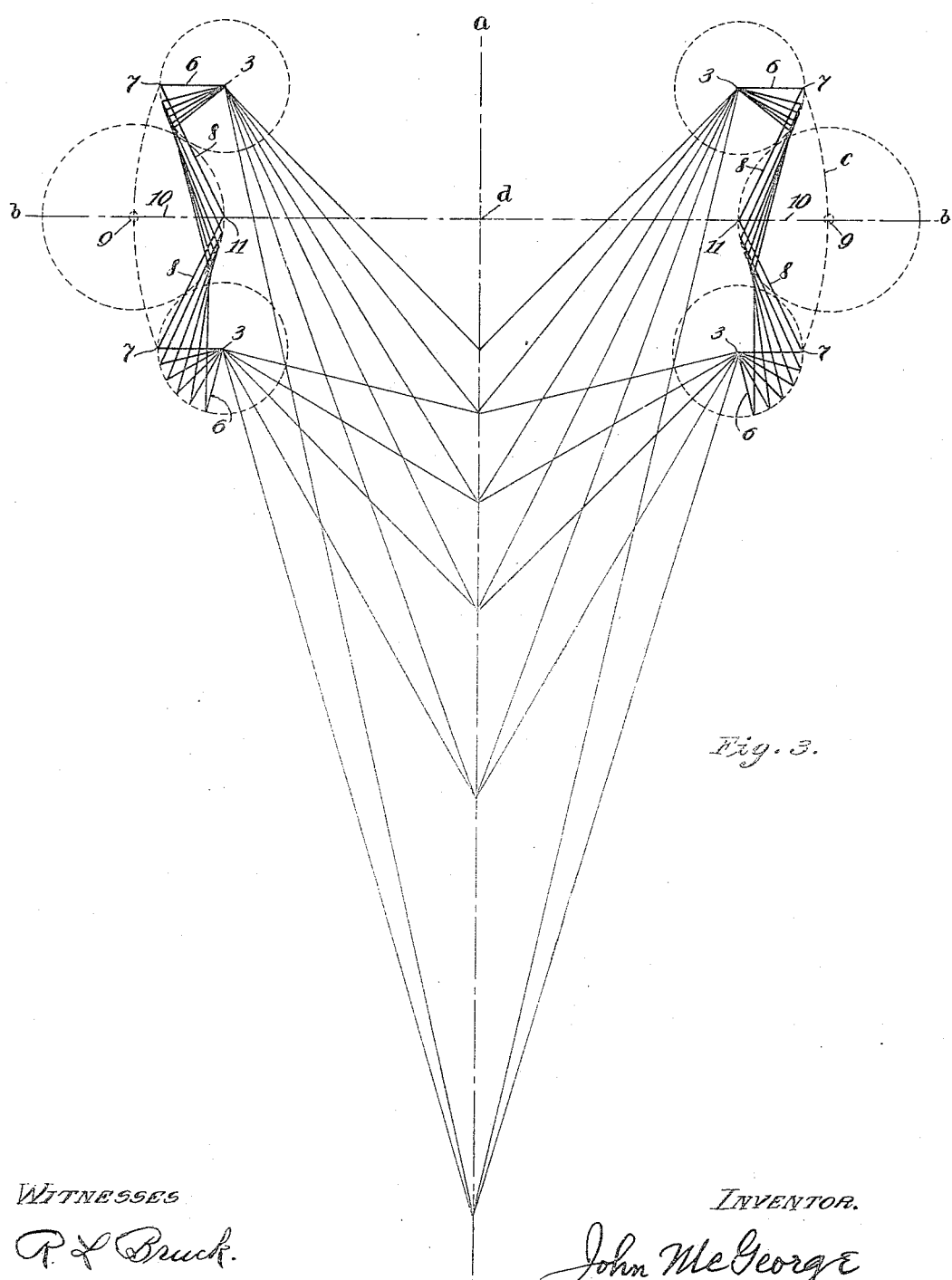
Figure 4:
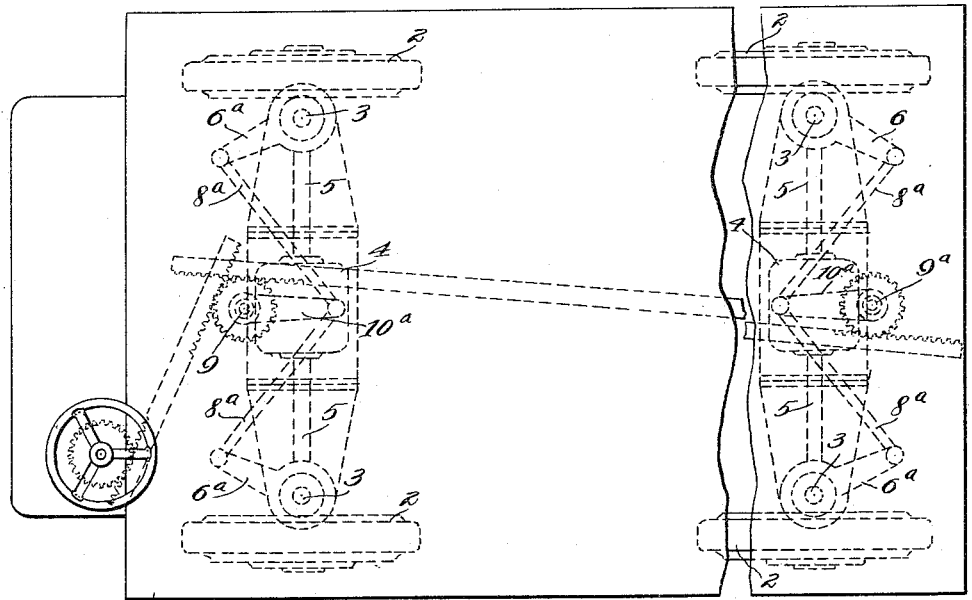
Figure 5:
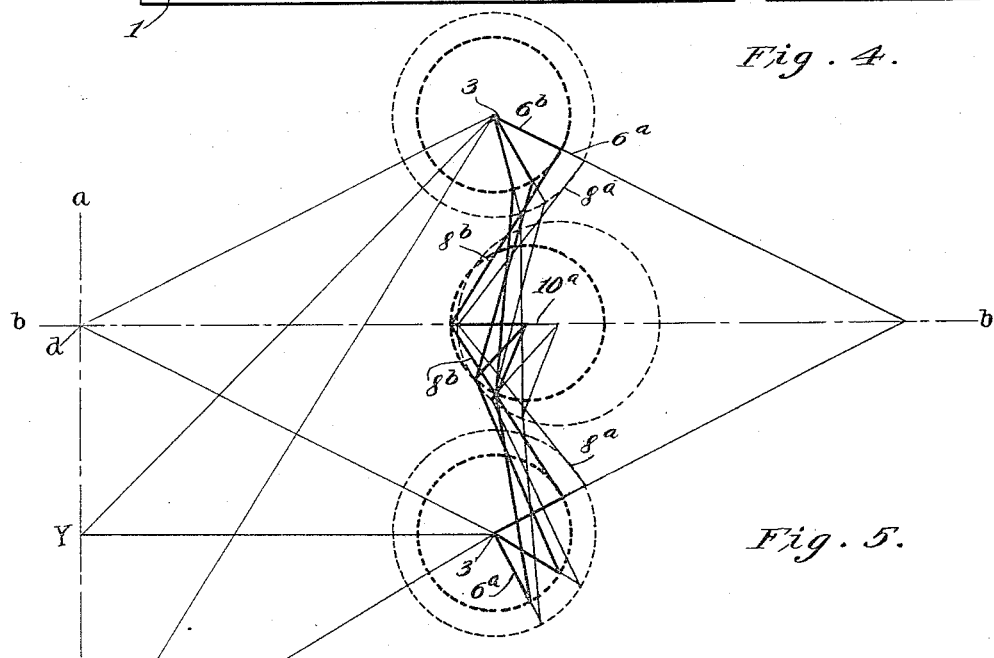

Generally speaking my invention may be defined as consisting of the combinations and arrangements defined in the claims hereto annexed and illustrated in the drawings accompanying and forming part of this application, wherein: Figure 1 is a top plan view of a truck built in accordance with a preferred form of my invention showing all of the wheels parallel with the longitudinal axis thereof; Fig. 2 is a similar view of the same truck illustrating the positions of the various wheels when turned through a rather large angle; Fig. 3 is a diagram following the construction of Fig. 1; Fig. 4 is a plan view of a truck built in accordance with a modified form of my invention; and Fig. 5 is a diagram following Fig. 4.

Describing the parts by reference characters, 1 represents the body of the vehicle which may be of any type depending upon the use to which the same is to be put, and 2—2 denotes the wheels. These wheels are of the combined driving and steering type, preferably of the type disclosed and claimed in my copending application filed Feb. 27, 1913, Ser. No. 751,117, although they may equally well follow the type of wheel disclosed in the prior patents of J. and H. Mc-George dated April 14, 1908, No. 884,782. These wheels are journaled upon suitable spindles which are pivoted to opposite points of the vehicle body upon substantially vertical axes. In the present embodiment this pivot is located at one side of the plane of the wheel itself, though it could equally well be within the plane of the wheel as illustrated in the patent above mentioned. Power is conveyed to each of these wheels from a suitable power source 4 through a driving shaft 5, and is preferably impressed upon the wheels through the agency of rotating means journaled coincidentally with the axes 3—3 as in the case of the application and patent hereinbefore mentioned.

Referring to Figs. 1, 2, and 3, it will be seen that I have provided each spindle with a wheel arm 6 having a pivot 7 at its end receiving a link 8, the plane containing the pivots 3 and 7 being substantially parallel to the plane of the adjacent wheel, and the distance between each spindle pivot and the arm pivot 7 being substantially one-fourth of the distance between adjacent spindle pivots 3—3. Each of these wheel arms projects toward the end of the vehicle nearest which it lies. Pivoted to a fixed part of the vehicle upon the same side of each axle as the wheel arms 6—6 is a vertical rock-shaft 9 to which is secured a single steering arm 10 having at its end a pivot 11 to which are attached the ends of the adjacent links 8—8.

The position of the shaft 9 is determined entirely by the position of the line of centers upon which the vehicle is to turn. Referring to Fig. 3, wherein $a$—$a$ represents the line of centers upon which turning is to take place, and $b$—$b$ represents the longitudinal axis of the vehicle, an arc $c$ is struck from the intersection $d$ of these lines so as to pass through the points 7—7 of similar wheel arms while in their parallel position, and the intersection of this arc with the vehicle axis $b$—$b$ fixes substantially the position of the rock shaft 9. The length of the steering arm 10 is substantially equal to the distance between the shaft 9 and the axle joining the pivots 3—3. The length of the links 8—8 is such as to connect the pivots 7—11 when the various arms are in parallel relation as shown in Fig. 1.

In the present embodiment, the wheels at the two ends of the vehicle are deflected simultaneously thus providing a four-wheel steer. To this end mechanical connections such as the pinions 12 and longitudinal rack bar 13 are provided whereby the rock shafts 9—9 may be rotated simultaneously upon the turning of the steering post 18. A four-wheel steer is preferable in my estimation from the fact that the line of centers is then symmetrically located with respect to the dimensions of the vehicle, and the vehicle will operate with equal facility in either direction, although for the purposes of this invention it is entirely immaterial whether all of the wheels be employed in steering or only the wheels at one end of the vehicle. The only effect of omitting the steering function from one pair of wheels would be to transfer the line of centers from a position midway between the two pairs of wheels to a position where it would coincide with the axis of one pair of wheels, the curvature of the arc $c$ and consequently the length of the steering arm 10 being correspondingly decreased. Accordingly for the investigation of the properties of this mechanism, it is sufficient to consider the two ends of the vehicle separately which will now be done.

It will be seen that each pair of links 8—8 forms a toggle joint whose angle is the greatest at the time when the wheels 2—2 are parallel to each other and to the direction of the vehicle. If the lever 10 be turned about its axis in either direction the effect will be, both to move the center of the toggle joint toward the side of the vehicle thus deflecting both steering wheels in the direction in which it is desired to go, and at the same time to bring the links more nearly into alinement thus straightening the toggle and increasing the distance between the free ends of the wheel arms 6—6, thus causing the wheels 2—2 to take different angles with respect to the axis of the vehicle as is necessary to cause them to radiate from a common point. Inasmuch as the angularity of the wheels with respect to each other depends upon the sharpness of the turn which is being made, being at zero when the vehicle is going directly forward and being at its maximum at the moment when the shortest possible turn is being made, and since the angularity of the wheels will be increased by increasing the distance between the wheel arms 6—6 as is done by the straightening of the toggle, it is clear that both of these actions take place in the same direction. The rate at which this toggle joint is straightened depends partly upon the movement toward the axle of the pivot points 7—7 and partly upon the movement away from the axle of the pivot point 11. The arms 6 and 10 start from a condition of substantial parallelism as illustrated in Figs. 1 and 3, and the direction of movement of the points 7 and 11 are therefore at first substantially parallel to each other, thus causing a deflection of the wheels at the same rate, as is proper from the fact that the center of turning is an infinite distance away. With the increase in the angle of displacement of the steering arm 10, the rate of straightening of the toggle joint becomes greater owing to the arrival of the points 7 and 11 at parts of their respective curves where the relative transverse movement is more rapid, thus giving the wheels a correspondingly greater difference in deflection as the center of curving is brought more and more near to the vehicle.

It is impossible to describe the length and location of different members other than "substantially." It is possible to vary the position of the shaft 9 and the length of the arms 10 and 6 within narrow limits without serious detriment to the operation of the device, although any change in one member necessitates a counteracting change in some other member, as will be well understood by those skilled in the art since the method of successive approximations is the method ordinarily employed for the designing of any steering gear. It will be found, however, with the employment of the mechanism hereinbefore described, that the deflection of each of the wheels through an angle of 85° or more will be permitted with an error well within the limits of commercial tolerance.

Another modification which can be adopted is effected by changing the angle between the wheel arms and the planes of the wheels as illustrated in Figs. 4 and 5. In this case the angle between each wheel arm and the plane of the adjacent wheel is made the same as the angle between the plane of the wheel and the line drawn from its spindle-pivot 3 to the point of intersection between the line of centers and the longitudinal axis of the vehicle. To the end of each arm is pivoted a link $8^a$ whose length is equal to one-half the distance between adjacent spindle pivots 3—3. The opposite end of each pair of links is pivoted to a steering arm $10^a$ whose length is substantially the same as that of the wheel arms $6^a$—$6^a$. The steering arms $10^a$—$10^a$ are carried by rock shafts $9^a$—$9^a$ as before, and may be operated in the manner heretofore described or in any other convenient mode. The location of the shafts $9^a$—$9^a$ is fixed absolutely by the length of the arms $6^a$ and $10^a$, inasmuch as the length of the links $8^a$ depends upon an outside quantity.

Within ordinary or reasonable limits the absolute length of the arms $6^a$ and $10^a$ appears to be rather unimportant so long as the same are substantially equal. This fact is clearly shown in Fig. 5, wherein the correctness of the design is diagrammatically illustrated for three conditions, namely, those in which the center of turning is at infinity, at a point $x$ near to the vehicle, and at a point $y$ in line with two of the pivots 3—3. The angle between the arms $6^a$ and the wheels can apparently be set at any point between that shown in Fig. 1 and that in Fig. 4, similar proportional changes being made in the length and arrangement of the parts 8, 9, and 10.

Owing to the number and complexity of the quantities involved it is apparently impossible to deduce a mathematical formula covering all of the modifications which this linkage can take within the scope of my invention or even defining the movements of the various parts of any one modification throughout the entire range of its movement. However, by starting with the directions herein contained, any person skilled in the art can produce a steering gear which will operate within a very small degree of error over every angle of deflection from zero to 85°, and with a small amount of experiment and variation which particular installations may require he can select a design which will afford a practically uniform error at all points, and one which is well within the limits of commercial tolerance. More particularly by employing such a steering gear with a combined steering and driving wheel, as I have here proposed, it is possible to employ the entire capabilities of the gear, thus rendering the vehicle more flexible, more easily controlled, and more serviceable for use in crowded and congested places than any heretofore known.

While I have necessarily described my invention in detail, so far as the same is susceptible of accurate explanation, I do not propose to confine myself to the details herein set forth except as the prior state of the art taken in conjunction with the terms of the claims hereto annexed may render it necessary.

Having thus described my invention, what I claim is:

1. A steering mechanism for self-propelled vehicles wherein power driven wheels are mounted on a pair of spindles that project radially from vertical pivot axes arranged at opposite sides of the vehicle, comprising an arm rigid with each spindle and projecting radially from its pivot axis upon the side thereof adjacent to the end of the vehicle, a steering arm pivoted upon a substantially vertical axis and extending in the opposite direction from said wheel arms, the axis of said steering arm being located upon the same side of said spindles as said wheel arms and in the center line of the vehicle, links pivoted to the free ends of said wheel arms and to said steering arm, and means for turning one of said arms about its pivot, each of said power driven wheels being located outside its vertical pivot axis and each of said radially projecting arms being situated inside the plane of the wheel corresponding thereto, the length of said steering arm being not less than the length of either of said wheel arms.

2. In a self-propelled vehicle, the combination, with a pair of spindles projecting radially from vertical pivot axes arranged at opposite sides of the vehicle and a power driven wheel journaled upon each of said spindles outside of its pivot axis, of an arm rigid with each spindle inside the plane of the wheel and projecting radially from its pivot axis upon the side thereof adjacent to the end of the vehicle, a steering arm pivoted upon a substantially vertical axis and extending in the opposite direction from said wheel arms, the axis of said steering arm being located upon the same side of said spindles as said wheel arms and in the center line of the vehicle, links pivoted to the free ends of said wheel arms and to said steering arm, and means for turning one of said arms about its pivot, both of said links being pivoted to said steering arm upon substantially the same axis, and the length of said steering arm being not less than that of said wheel arms.

3. A steering mechanism for self-propelled vehicles wherein power driven wheels are mounted on a pair of spindles that project radially from vertical pivot axes arranged at opposite sides of the vehicle, comprising an arm rigid with each spindle and projecting radially from its pivot axis upon the side thereof adjacent to the end of the vehicle, a steering arm pivoted upon a substantially vertical axis and extending in the opposite direction from said wheel arms, the axis of said steering arm being located upon the same side of said spindles as said wheel arms and in the center line of the vehicle, links pivoted to the free ends of said wheel arms and to said steering arm, and means for turning one of said arms about its pivot, each of said power driven wheels being located outside its vertical pivot axis and each of said radially projecting arms being situated inside the plane of the wheel corresponding thereto, the pivot axis between said steering arm and said links coinciding substantially with the line joining said wheel pivots when said steering arm is in central position.

4. In a self-propelled vehicle, the combination, with a pair of spindles projecting radially from vertical pivot axes arranged at opposite sides of the vehicle and a power driven wheel journaled upon each of said spindles outside of its pivot axis, of an arm rigid with each spindle inside the plane of the wheel and projecting radially from its pivot axis upon the side thereof adjacent to the end of the vehicle, a steering arm pivoted upon a substantially vertical axis and extending in the opposite direction from said wheel arms, the axis of said steering arm being located upon the same side of said spindles as said wheel arms and in the center line of the vehicle, links pivoted to the free ends of said wheel arms and to said steering arm, and means for turning one of said arms about its pivot, both of said links being pivoted to said steering arm upon substantially the same axis, said steering arm being pivoted upon an axis located substantially upon the center line of the vehicle at the point where the same is intersected by an arc cut from the intersection of said center line and the line of centers and intersecting the ends of said wheel arms when in neutral position.

5. In a self-propelled vehicle, the combination, with a pair of spindles pivoted for deflection about vertical axes at opposite sides of the vehicle, and wheels journaled upon said spindles, of an arm rigid with each spindle and projecting perpendicularly therefrom upon the side thereof adjacent to the end of the vehicle, a steering arm pivoted upon a substantially vertical axis substantially midway between the ends of said arms, said steering arm being of a length not less than that of said wheel arms and projecting in the opposite direction, links pivoted to said wheel arms and to said steering arm, the length of said links being not less than half the distance between said wheel pivots and both of said links being pivoted to said steering arms upon substantially the same axis, and means for turning one of said arms about its pivot.

4. In a steering gear for self-propelled vehicles, the combination, with a pair of wheel supporting spindles pivoted for deflection about vertical axes at opposite sides of the vehicle, of an arm rigid with each spindle and projecting transversely therefrom upon the side thereof adjacent to the end of the vehicle, each of said arms being substantially perpendicular to the axis of said spindle, a steering arm pivoted upon a substantially vertical axis, said axis being located substantially upon the center line of the vehicle at the point where the same is intersected by an arc struck from the intersection of said center line and the line of centers and intersecting the ends of said wheel arms when in neutral position, said steering arm projecting from said axis in a direction opposite to the direction of said wheel arms, links pivoted to said wheel arms and to said steering arm, and means for turning one of said arms about its pivot.

5. In a steering gear for self-propelled vehicles, the combination, with a pair of wheel supporting spindles pivoted for deflection about vertical axes at opposite sides of the vehicle, of an arm rigid with each spindle and projecting transversely therefrom upon the side thereof adjacent to the end of the vehicle, each of said arms being substantially perpendicular to the axis of said spindle, a steering arm pivoted upon a substantially vertical axis, said axis being located substantially upon the center line of the vehicle at the point where the same is intersected by an arc struck from the intersection of said center line and the line of centers and intersecting the ends of said wheel arms when in neutral position, said steering arm projecting from said axis in a direction opposite to the direction of said wheel arms, links pivoted to said wheel arms and to said steering arm, both of said links being pivoted to said steering arm upon substantially the same axis, and means for turning said steering arm about its pivot.

In testimony whereof, I hereunto affix my signature in the presence of two witnesses.

JOHN McGEORGE.

Witnesses:
Harold E. Burns,
Emanuel N. West.